United States Patent
Chang et al.

(10) Patent No.: US 9,418,320 B2
(45) Date of Patent: Aug. 16, 2016

(54) APPARATUS AND METHOD FOR DETECTING OBJECT USING PTZ CAMERA

(71) Applicants: Seoul National University Industry Foundation, Seoul (KR); HANWHA TECHWIN CO.,LTD., Changwon-Si (KR)

(72) Inventors: Il-Kwon Chang, Changwon (KR); Jeong-Eun Lim, Changwon (KR); Soo-Wan Kim, Seoul (KR); Sun-Jung Kim, Seoul (KR); Kwang Moo Yi, Seoul (KR); Ki-Min Yun, Seoul (KR); Jin Young Choi, Seoul (KR)

(73) Assignees: Seoul National University Industry Foundation, Seoul (KR); Hanwha Techwin Co., Ltd., Changwon-si (KR)

( * ) Notice: Subject to any disclaimer, the term of this patent is extended or adjusted under 35 U.S.C. 154(b) by 406 days.

(21) Appl. No.: 13/682,137

(22) Filed: Nov. 20, 2012

(65) Prior Publication Data
US 2013/0129144 A1 May 23, 2013

(30) Foreign Application Priority Data
Nov. 23, 2011 (KR) .................. 10-2011-0123116

(51) Int. Cl.
| | |
|---|---|
| G06K 9/00 | (2006.01) |
| G06K 9/78 | (2006.01) |
| G06K 9/62 | (2006.01) |
| G06T 7/00 | (2006.01) |
| G06T 7/20 | (2006.01) |

(52) U.S. Cl.
CPC .. *G06K 9/78* (2013.01); *G06K 9/62* (2013.01); *G06T 7/003* (2013.01); *G06T 7/2053* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 6,798,897 B1 | 9/2004 | Rosenberg | |
| 7,860,311 B2 | 12/2010 | Chen et al. | |
| 8,208,733 B2 | 6/2012 | Park | |
| 8,358,691 B1* | 1/2013 | Wang et al. | 375/240.02 |
| 2004/0125207 A1* | 7/2004 | Mittal et al. | 348/169 |

(Continued)

FOREIGN PATENT DOCUMENTS

KR  10-2009-0015456 A  2/2009

OTHER PUBLICATIONS

Mittal, A. and Huttenlocher, D. "Scene Modeling for Wide Area Surveillance and Image Synthesis", IEEE 2000.*

(Continued)

*Primary Examiner* — Vu Le
*Assistant Examiner* — Samah Beg
(74) *Attorney, Agent, or Firm* — Sughrue Mion, PLLC

(57) ABSTRACT

An apparatus for detecting an object includes a filter for filtering a current input image and a background model generated based on a previous input image, a homography matrix estimation unit for estimating a homography matrix between the current input image and the background model, an image alignment unit for converting the background model by applying the homography matrix to a filtered background model and aligning a converted background model and a filtered current input image, and a foreground/background detection unit for detecting a foreground by comparing corresponding pixels between the converted background model and the filtered current input image.

16 Claims, 5 Drawing Sheets

(56) References Cited

U.S. PATENT DOCUMENTS

| | | | | |
|---|---|---|---|---|
| 2007/0273765 | A1* | 11/2007 | Wang et al. | 348/152 |
| 2008/0031492 | A1* | 2/2008 | Lanz | 382/103 |
| 2008/0130948 | A1* | 6/2008 | Ozer | G06K 9/00228 382/103 |
| 2008/0166045 | A1* | 7/2008 | Xu et al. | 382/170 |
| 2008/0181453 | A1* | 7/2008 | Xu et al. | 382/103 |
| 2008/0226172 | A1* | 9/2008 | Connell | G06K 9/38 382/181 |
| 2009/0060278 | A1* | 3/2009 | Hassan-Shafique | G06K 9/00771 382/103 |
| 2009/0087096 | A1* | 4/2009 | Eaton et al. | 382/190 |
| 2010/0208987 | A1* | 8/2010 | Chang et al. | 382/165 |
| 2010/0290710 | A1* | 11/2010 | Gagvani et al. | 382/224 |
| 2011/0142283 | A1* | 6/2011 | Huang et al. | 382/103 |
| 2014/0056519 | A1* | 2/2014 | Gupta | G06T 7/0081 382/173 |
| 2015/0063708 | A1* | 3/2015 | Sripadarao | G06K 9/00228 382/199 |
| 2016/0004929 | A1* | 1/2016 | Varghese | G06K 9/00771 382/103 |

OTHER PUBLICATIONS

Wren et al. "Pfinder: Real-time tracking of the human body", IEEE Transactions on Pattern Analysis and Machine Intelligence, vol. 19(7), Jul. 1997, pp. 780-785.*

Haritaoglu et al. "W4: Real-time surveillance of people and their activities", IEEE 2000, vol. 22(8), pp. 809-830.*

ElGammal et al. "Background and foreground modeling using nonparametric kernel density estimation for visual surveillance", IEEE 2002, vol. 90(7), pp. 1151-1163.*

Benezeth et al. "Review and evaluation of commonly-implemented background subtraction algorithms", IEEE 2008.*

Luo, X. and Bhandarkar, S. "Real-Time and Robust Background Updating for Video Surveillance and Monitoring," ICIAR 2005, LNCS 3656, pp. 1226-1233.*

Butler et al. "Real-Time Adaptive Foreground/Background Segmentation," EURASIP Journal on Applied Signal Processing 2005:14, pp. 2292-2304.*

C. Stauffer and W.E.L. Grimson, "Learning Patterns of Activity Using Real-Time Tracking", IEEE Transactions on Pattern Analysis and Machine Intelligence, 2000, vol. 22, No. 8, pp. 747-757.*

Gallego et al. "Segmentation and Tracking of Static and Moving Objects in Video Surveillance Scenarios", IEEE, ICIP 2008, p. 2716-2719.*

Lim, Chun-Hwan et al., "Object Segmentation for Image Transmission Services and Facial Characteristic Detection based on Knowledge," Sep. 3, 1999, pp. 26-31.

Jung, Yong-Bae et al., "Implementation of a Robust Visual Surveillance Algorithm under outdoor environment," Oct. 2, 2009, pp. 112-119.

Communication, dated Jan. 22, 2013, issued by the Korean Intellectual Property Office in counterpart Korean Patent Application No. 10-2011-0123116.

Kang, Sangkyu, et al., "Real-time video tracking using PTZ cameras," Proc. of SPIE 6th International Conference on Quality Control by Artificial Vision, vol. 5132, May 2003, Gatlinburg, TN, USA, pp. 103-111.

* cited by examiner

APPARATUS AND METHOD FOR DETECTING OBJECT USING PTZ CAMERA

CROSS-REFERENCE TO RELATED PATENT APPLICATIONS

This application claims priority from Korean Patent Application No. 10-2011-0123116, filed on Nov. 23, 2011, in the Korean Intellectual Property Office, the disclosure of which is incorporated herein in its entirety by reference.

BACKGROUND

1. Field

Apparatuses and methods consistent with exemplary embodiments relate to detecting an object moving in an image input from a pan, tilt, and zoom (PTZ) camera.

2. Description of the Related Art

An object detection algorithm using a PTZ camera includes a motion separation technology using an optical flow. This technology is related to a method of grouping movements using an optical flow because foregrounds having their own movements seem to show different movements from one another while a movement of a camera is the same as a background.

Another object detection algorithm using a PTZ camera is a method of making an entire area within ranges of movements of a horizontal axis and a vertical axis of a camera, a large background model, in detecting a moving object. According to the method, a large background model is generated as a camera moves and a portion corresponding to a current input image is found from the large background model. The large background model and the portion corresponding to a current input image are compared with each other, and thus, a moving object may be detected. The method may be classified into a method using camera PTZ information and another method that does not use camera PTZ information.

Further, another object detection algorithm using a PTZ camera is a method of generating a background model having the same size as an input image.

SUMMARY

One or more exemplary embodiments provide an apparatus and method for effectively and accurately detecting a moving object in a monitoring system using a pan, tilt, and zoom (PTZ) camera.

According to an aspect of an exemplary embodiment, an apparatus for detecting an object includes a filter for filtering a current input image and a background model generated based on a previous input image, a homography matrix estimation unit for estimating a homography matrix between the current input image and the background model, an image alignment unit for converting the background model by applying the homography matrix to a filtered background model and aligning a converted background model and a filtered current input image, and a foreground/background detection unit for detecting a foreground by comparing corresponding pixels between the converted background model and the filtered current input image.

The apparatus may further include a feature points extraction unit for extracting feature points of the background model and tracking corresponding feature points in the current input image, wherein the homography matrix estimation unit estimates the homography matrix based on a relationship between the feature points of the current input image and the background model.

The filter may be a difference of Gaussian (DOG) filter.

The foreground/background detection unit may classify a current pixel of the current input image into a foreground pixel or a background pixel, using time-space information of the converted background model, based on a time-mean value and a variance value of comparison pixels of the converted background model which correspond to the current pixel and at least one neighboring pixel of the current pixel, and each of the neighboring pixels may be a pixel having a Euclidian distance from the current pixel in a space which is within a first threshold value.

The foreground/background detection unit may classify the current pixel into a background pixel if a difference between a time-mean value of at least one of the comparison pixels and a pixel value of the current pixel may be smaller than a multiplication of a variance value of the comparison pixel and a second threshold value.

The apparatus may further include a tracking unit for generating a label for a detected foreground and tracking the detected foreground in next input images.

A foreground having the same label may be continuously detected in the next input images as a result of the tracking, the foreground/background detection unit may compare a current pixel of the foreground and a pixel of the background model corresponding to the current pixel in an estimated detection area of the foreground and classify the current pixel into a foreground pixel or a background pixel, without considering a background around the current pixel.

The apparatus may further include a background update unit for updating the converted background model based on time information of each pixel of the filtered current input image.

The background update unit may set an age value for each pixel of the filtered current input image which is set according to overlapping of the pixel between the filtered current input image and at least one next input image, and update the converted background model based on a weighted sum of a time-mean value of a pixel of the converted background model and a pixel value of a pixel of the filtered current input image by using a reciprocal number of the age value.

According to an aspect of another exemplary embodiment, a method of detecting an object includes filtering a current input image and a background model generated based on a previous input image, estimating a homography matrix between the current input image and the background model, converting the background model by applying the homography matrix to a filtered background model and aligning a converted background model and a filtered current input image, and detecting a foreground by comparing corresponding pixels between the converted background model and the filtered current input image.

The estimating the homography matrix may include extracting feature points of the background model and tracking corresponding feature points in the current input image, and estimating the homography matrix based on a relationship of the feature points between the current input image and the background model.

The filtering the current input image and the background model may include filtering the background model using a difference of Gaussian (DOG) filter.

The detecting the foreground may include classifying a current pixel of the current input image into a foreground pixel or a background pixel, using time-space information of the converted background model, based on a time-mean value and a variance value of comparison pixels of the converted background model which correspond to the current pixel and at least one neighboring pixel of the current pixel, and each of the neighboring pixels may be a pixel having a Euclidian distance from the current pixel in a space which is within a first threshold value.

The classifying of a current pixel of the current input image may include classifying the current pixel into a background pixel if a difference between a time-mean value of at least one of the comparison pixels and a pixel value of the current pixel may be smaller than a multiplication of a variance value of the comparison pixel and a second threshold value.

The method may further include generating a label for a detected foreground and tracking the detected foreground in next input images.

When a foreground having the same label is continuously detected in the next input images as a result of the tracking, the detecting the foreground may include comparing a current pixel of the foreground and a pixel of the converted background model corresponding to the current pixel in an estimated detection area and classifying the current pixel into a foreground pixel or a background pixel, without considering a background around the current pixel.

The method may further include updating the converted background model based on time information of each pixel of the filtered current input image.

The updating the background model may include setting an age value for each pixel of the filtered current input image which is set according to overlapping of the pixel between the filtered current input image and at least one next input image, and updating the converted background model based on a weighted sum of a time-mean value of a pixel of the converted background model and a pixel value of a pixel of the filtered current input image by using a reciprocal number of the age value.

BRIEF DESCRIPTION OF THE DRAWINGS

The above and other aspects will become more apparent by describing in detail exemplary embodiments thereof with reference to the attached drawings, in which.

DETAILED DESCRIPTION

Figure 1:
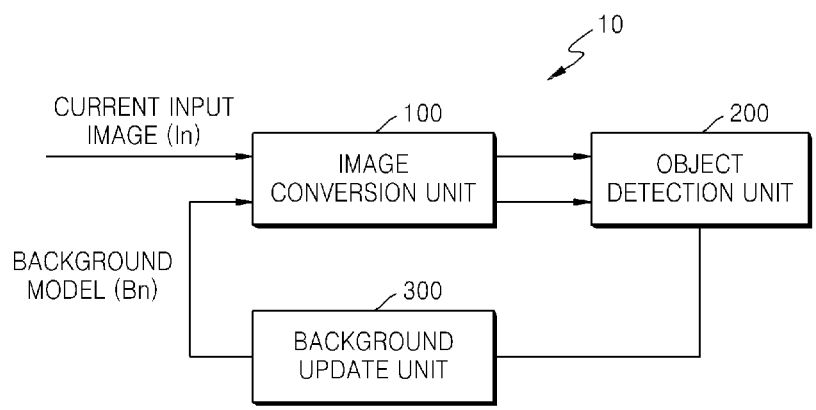
FIG. 1 is a block diagram schematically illustrating an object detection apparatus according to an exemplary embodiment.

The attached drawings for illustrating exemplary embodiments are referred to in order to gain a sufficient understanding of the inventive concept, the merits thereof, and the objectives accomplished by the implementation of the inventive concept. Hereinafter, the inventive concept will be described in detail by explaining exemplary embodiments with reference to the attached drawings. Like reference numerals in the drawings denote like elements.

As used herein, the term "and/or" includes any and all combinations of one or more of the associated listed items. Expressions such as "at least one of," when preceding a list of elements, modify the entire list of elements and do not modify the individual elements of the list.

A motion separation method using an optical flow has a drawback in that an operation speed is very slow. There is a method of tracking an optical flow in units of sections instead of in units of pixels with respect to an entire image in order to use the optical flow real time. However, the method is inappropriate because the robustness of a system is guaranteed by detecting a foreground from all pixels considering a purpose of a detection algorithm.

A method of generating a large background model requires a large storage space to store a created background model. Also, an entire background model needs to be continuously updated according to a flow of time. However, since update can be made only in a place where an input image exists, when a camera is located in an area where update is not continuously made after a predetermined time passes, it is impossible to accurately detect an object. Further, since an area where an input image is located in a large background model needs to be always searched for, a longer time takes as the size of a background model increases.

A method of generating a background model having the same size as an input image requires a fast and small storage space. However, since it is difficult to create an accurate background model, frequent misdetections of an object are a drawback of the method. In particular, misdetections may occur many times in an outline portion, and an error generated during input image conversion may continuously accumulate in a background model. Also, when an object is small or the color of an object is similar to that of a background, detection of an object becomes difficult.

According to the inventive concept, feature points between adjacent two images, that is, a background model updated by a previous input image and a current input image, are tracked, and thus a homography matrix of the two images is calculated. The background model passing through a difference of Gaussian (DOG) filter is converted using a calculated homography matrix. Then, an area overlapping the current input image is searched for. A moving object is searched for from the current input image considering information of neighboring pixels. The background model is updated through time-based information so that a moving object may be accurately detected in real time.

Figure 9:
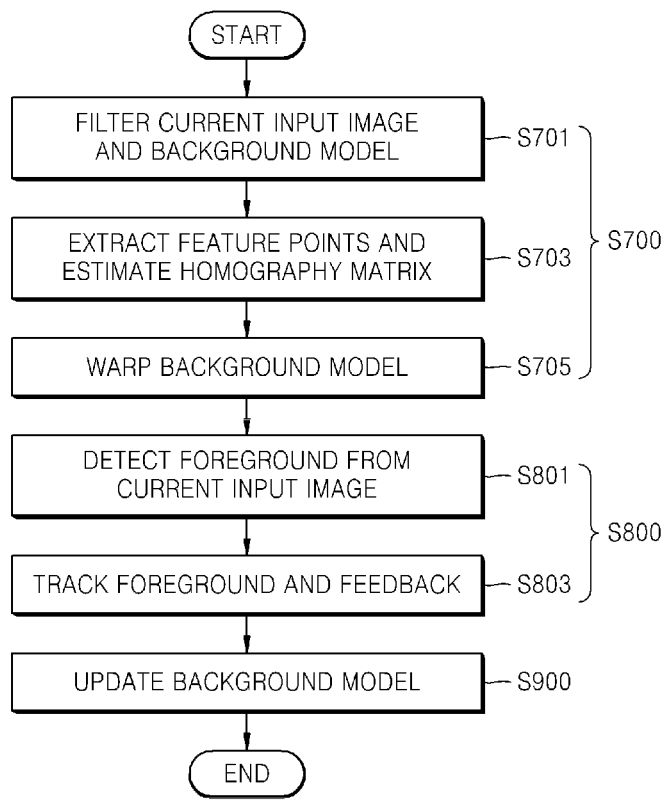
FIG. 9 is a flowchart for explaining a method of detecting an object according to an exemplary embodiment.

FIG. 1 is a block diagram schematically illustrating an object detection apparatus according to an exemplary embodiment. FIG. 9 is a flowchart for explaining a method of detecting an object according to an exemplary embodiment. The operation of an object detection apparatus of FIG. 1 is described below with reference to FIG. 9.

The first input image is set as the first background model. Detection of an object is performed from the second input image. For example, the object detection is performed as the second input image that is a current input image is compared with the background model that is the first input image.

Referring to FIG. 1, the object detection apparatus according to the present embodiment includes an image conversion unit 100, an object detection unit 200, and a background update unit 300.

The image conversion unit 100 defines a relationship between a current input image and a background model (background image), and converts the two images (S700). The current input image is an RGB image captured by a pan, tilt, and zoom (PTZ) camera, and input scenes according to time may vary due to a motion of the PTZ camera. The background model is an RGB image generated based on a previous input image. Accordingly, the current input image and the background model are adjacent images in terms of time. The background model is generated to have the same size as the current input image. Thus, the object detection apparatus according to the present embodiment has a fast detection speed and small storage space compared to a method of generating a large background model.

Figure 2:
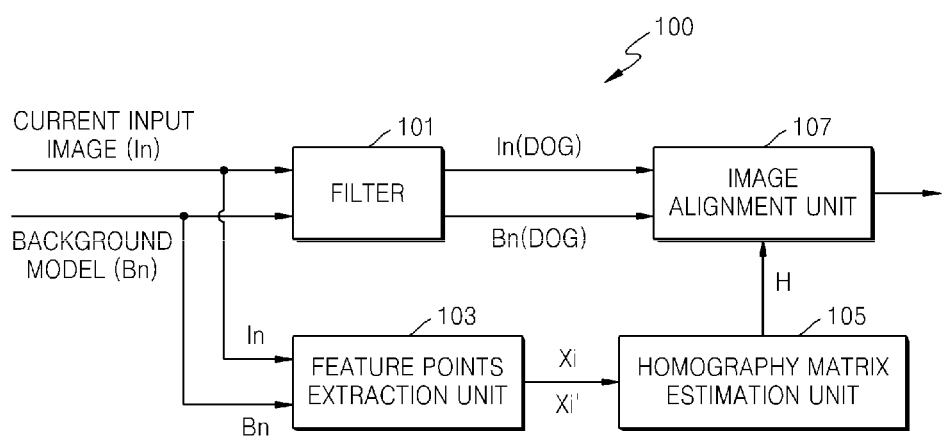
FIG. 2 is a block diagram schematically illustrating an internal structure of an image conversion unit of FIG. 1, according to an exemplary embodiment.

FIG. 2 is a block diagram schematically illustrating an internal structure of the image conversion unit 100 of FIG. 1. Referring to FIG. 2, the image conversion unit 100 includes a filter 101, a feature points extraction unit 103, a homography matrix estimation unit 105, and an image alignment unit 107.

The filter 101 filters the current input image and the background model (S701). The filter 101 generates a corrected image with an emphasized outline by filtering the current input image and the background model. The filter 101 may be a DOG filter expressed by Equation 1. The DOG filter includes two DOGs having different variances and has an effect of emphasizing an outline in an image. Thus, an object may be further accurately detected by applying a DOG filter to an image showing an object to be detected that is very small or an image having a low contrast. Since the DOG filter is a well-known technology, a detailed description thereof will be omitted herein. Although detection of a motion of a corrected image by using a DOG filter is described below, the inventive concept is not limited to the use of a DOG filter and a variety of filters capable of improving image quality may be used. The filter 101 outputs the current input image and the background model that are DOG filtered according to Equation 1. In Equation 1, a letter "x" denotes a pixel.

$$f(x, \mu, \sigma_1, \sigma_2) = \frac{1}{\sigma_1 \sqrt{2\pi}} \exp\left(-\frac{(x-\mu)^2}{2\sigma_1^2}\right) - \frac{1}{\sigma_2 \sqrt{2\pi}} \exp\left(-\frac{(x-\mu)^2}{2\sigma_2^2}\right) \quad (1)$$

The feature points extraction unit 103 extracts feature points from the current input image and the background model (S703). The current input image and the background model in use are RGB images before filtering to which the filter 101 is not applied. The feature points extraction unit 103 extracts corresponding feature points between the two images by extracting a feature point Xi from the background model and tracking a feature point Xi' corresponding to the feature point Xi in the current input image. The feature points may be extracted by, for example, a Kanade-Lucas-Tomasi (LKT) tracking method. Since the LKT tracking method is a well-known technology, a detailed description thereof will be omitted herein.

The homography matrix estimation unit 105 estimates a homography matrix H between the current input image and the background model (S703). Since the size of the background model and the size of the input image are the same and the background model is generated based on a previous input image, when the PTZ camera captures an image by changing a PTZ value, a time different exists between the current input image and the background model so that an overlapping area between the two images and a newly input area exist. Thus, there is a demand to define a relationship between the two images. The relationship between the current input image and the background model may be expressed by Equation 2 that shows the homography matrix H between the feature point $X_i$ extracted from the background and the feature point $X_i'$ extracted from the current input image. In Equation 2, "(x,y)" denotes a location (coordinate) of a pixel in an image.

$$[X_1, X_2, \ldots] = H[X'_1, X'_2, \ldots], \text{ where } X_i = (x_i, y_i, 1)^T, X'_i = (x'_p, y'_p, 1)^T \quad (2)$$

Figure 3:
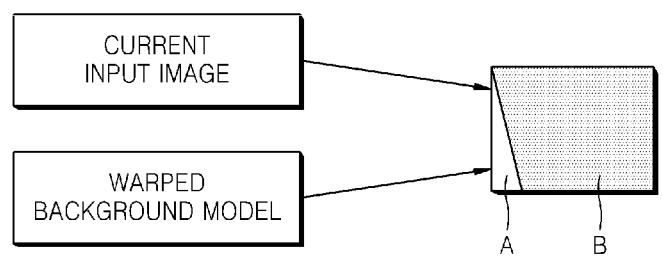
FIG. 3 is a view illustrating an example that a current input image and a warped background model are aligned according to an exemplary embodiment.

The image alignment unit 107 converts the background model by applying the homography matrix H to a corrected (filtered) background model, and aligns a converted background model and a filtered current input image (S705). A process of converting the background model by applying the homography matrix H thereto is referred to as warping. FIG. 3 is a view illustrating an example that a current input image and a warped background model are aligned according to an exemplary embodiment. Referring to FIG. 3, the image alignment unit 107 aligns a warped background model and the corrected current input image, and detects an overlapped (superposed) area B between the two images and a newly input area A. A moving object is searched for in the overlapping area B, whereas the newly input area A is applied to a background model update.

The object detection unit 200 detects a moving object by comparing corresponding pixels between the background model and the current input image (S800). Here, the background model is an image that is warped after corrected by the DOG filtering, whereas the current input image is an image corrected by the DOG filtering. For convenience of explanation, the image to be processed by the object detection unit 200 is referred to as the current input image or the background model without adding a description that the image to be processed is an image corrected by the DOG filtering or the DOG filtering/warping. According to an exemplary embodiment, however, the object detection unit 200 may detect a moving object by comparing corresponding pixels between a background model, which is not filtered and warped, and a current input image which is not filtered. In this case, the image conversion unit 100 may simply receive an input image without filtering, warping and aligning.

Figure 4:
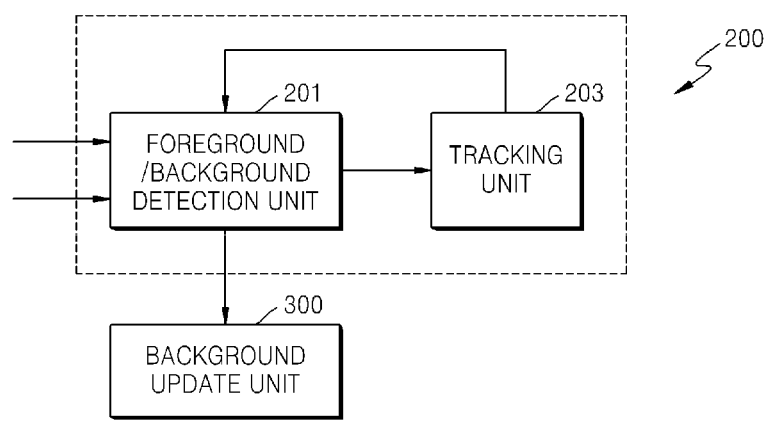
FIG. 4 is a block diagram schematically illustrating an internal structure of an object detection unit of FIG. 1, according to an exemplary embodiment.

FIG. 4 is a block diagram schematically illustrating an internal structure of an object detection unit of FIG. 1. Referring to FIG. 4, the object detection unit 200 includes a foreground/background detection unit 201 and a tracking unit 203.

Figure 5A:
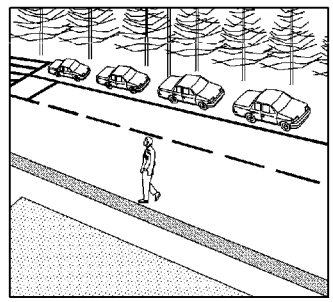
FIGS. 5A and 5B show a result of extracting a foreground from a current input image according to an exemplary embodiment.
Figure 5B:
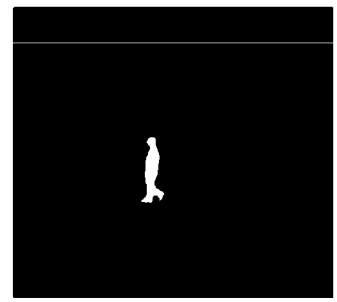

The foreground/background detection unit 201 detects a foreground from the current input image by using time-space information of the background model (S801). The foreground/background detection unit 201 may detect a moving object, that is, a foreground, by comparing corresponding pixels between the current input image and the background model, and classifying foreground pixels and background pixels in the current input image. FIGS. 5A and 5B show a result of extracting a foreground from a current input image according to an exemplary embodiment. Referring to FIGS. 5A and 5B, the foreground/background detection unit 201 may detect a foreground from a current input image of FIG. 5A, and output a binary foreground detection image of FIG. 5B.

In a related art, when a pixel is determined as a foreground or background, a pixel value is compared between a current pixel of an input image and a corresponding pixel of a background model. As a result of the comparison, the pixel is determined as a foreground when a difference is large and a background when the difference is small. This method is useful in detecting an object by using a fixed camera, but lots of misdetections occur when a PTZ camera is used for the object detection.

Accordingly, the foreground/background detection unit 201 determines whether a current pixel of the current input image is a foreground pixel or a background pixel, considering not only a pixel value in the background model (hereinafter, referred to as the "background value") of a pixel corresponding the current pixel in the current input image but also background values of neighboring pixels of the current pixel. A time-mean pixel value (hereinafter, referred to as the "time-mean value") is used as the background value. The time-mean value represents a mean of pixel values of pixels corresponding from the first frame to the nth frame. That is, the foreground/background detection unit 201 detects a foreground from the current input image by using the time-space information of the background model so that misdetection may be reduced and robust object detection may be performed.

$$x_i = \begin{cases} BG & \text{if } \exists x_j, dist(x_i, x_j) < T_1, \text{Mean}(x_j) - \text{Input}(x_i) < T_2 \cdot \text{Var}(x_j) \\ FG & \text{otherwise} \end{cases} \quad (3)$$

In Equation 3, "dist" denotes a Euclidian distance in space and "Mean" denotes a mean of pixels of the background model (hereinafter, referred to as the "background mean value"), that is, a mean of pixel values of corresponding pixels in a predetermined number of the background model. Also, "Input" denotes a pixel value of a pixel of the current input image, "Var" denotes a variance value of a pixel of the background model (hereinafter, referred to as the "background variance value"), and "T1" and "T2" denote preset threshold values. A neighboring pixel $x_j$ is a pixel whose Euclidian distance from a current pixel $x_i$ is within the first threshold value T1. In Equation 3, "x" denotes a certain pixel.

The foreground/background detection unit 201 classifies the current pixel into a foreground pixel or a background pixel based on a time-mean value and a variance value of pixels of the background model corresponding to the current pixel $x_i$ and at least one neighboring pixel $x_j$ of the current input image, that is, comparison pixels. The foreground/background detection unit 201 determines the current pixel $x_i$ as a background pixel BG when a difference between the background mean value of at least one of the comparison pixels and the pixel value of the current pixel $x_i$ is less than the multiplication of the second threshold value T2 and the background variance value of the comparison pixel. Otherwise, the foreground/background detection unit 201 determines the current pixel $x_i$ as a foreground pixel FG.

Figure 6:
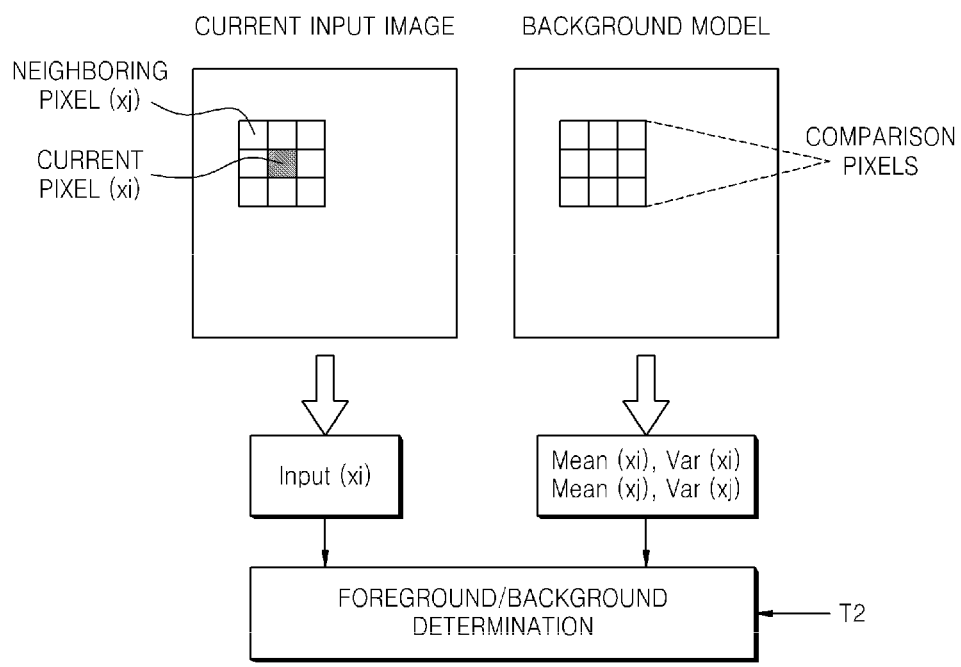
FIG. 6 is a view illustrating a method of determining a foreground pixel and a background pixel according to an exemplary embodiment.

FIG. 6 is a view illustrating a method of determining a foreground pixel and a background pixel according to an exemplary embodiment.

The foreground/background detection unit 201 detects the current pixel $x_i$ of the current input image and the neighboring pixels $x_j$ whose Euclidian distance is within a range of the first threshold value T1. Referring to FIG. 6, the current pixel $x_i$ of the current input image and eight (8) neighboring pixels $x_j$ having Euclidian distance from the current pixel $x_i$ within the first threshold value T1 are shown in the current input image. In the background model, pixels of the background model corresponding to the current pixel $x_i$ and the neighboring pixels $x_j$ of the current input image, that is, nine (9) comparison pixels, are illustrated.

The foreground/background detection unit 201 determines whether the current pixel $x_i$ is a foreground pixel based on the background mean value of the comparison pixels of the background model and the pixel value of the current pixel $x_i$ of the current input image. Referring to FIG. 6, the foreground/background detection unit 201 performs calculation of Equation 3 on the background mean values Mean($x_i$) and Mean ($x_j$), and the background variance values Var($x_i$) and Var($x_j$), of a pixel subject to comparison among the nine comparison pixels, the second threshold value T2, and the pixel value Input($x_i$) of the current pixel $x_i$. The foreground/background detection unit 201 determines the current pixel $x_i$ as a background pixel when at least one of the comparison pixels satisfies Equation 3. Otherwise, the foreground/background detection unit 201 determines the current pixel $x_i$ as a foreground pixel.

The comparison order of the comparison pixels may vary according to user's settings. For example, when comparison of a pixel of the comparison pixels corresponding to the current pixel $x_i$ has priority, the foreground/background detection unit 201 may first compare the current pixel $x_i$ of the current input image and a pixel of the comparison pixels corresponding to the current pixel $x_i$. In this case, $x_j$ in Equation 3 is $x_i$. When Equation 3 is satisfied as a result of the comparison using the pixel values Input($x_i$), Mean($x_i$), Var ($x_i$), the foreground/background detection unit 201 may determine the current pixel $x_i$ as the background pixel BG. When Equation 3 is not satisfied as a result of the comparison, the foreground/background detection unit 201 does not determine the current pixel $x_i$ as a foreground pixel and may compare another comparison pixel with the current pixel $x_i$. When all the other comparison pixels do not satisfy Equation 3, the foreground/background detection unit 201 may determine the current pixel $x_i$ as a foreground pixel.

The foreground/background detection unit 201 receives as a feedback a foreground tracking result of the previous input image from the tracking unit 203. The foreground/background detection unit 201 changes a foreground/background determination mode when foregrounds continuously detected for a predetermined time (a predetermined number of images) are determined to be the same object even when the sizes of the foregrounds are different from one another as a result of foreground tracking.

Since the foreground/background detection unit 201 detects a foreground considering a background around a pixel, when a foreground and a background are similar to each other, a foreground pixel is determined as a background pixel so that the size of the foreground may be reduced. Thus, when the continuously detected foregrounds are determined to be the same object as a result of foreground tracking for a predetermined time, the foreground/background detection unit 201 determines whether the pixel is a foreground, without considering a background around the pixel. That is, the foreground/background detection unit 201 estimates a detection area of a foreground and compares a current pixel of the current input image and a corresponding pixel of the background model in an estimated detection area. The foreground/background detection unit 201 compares a pixel value of a current pixel of the current input image and a pixel value of a corresponding pixel of the background model, and determines the current pixel as a foreground pixel when a difference of a comparison result is large and the current pixel as a background pixel when a difference of a comparison result is small. Thus, foreground misdetection error due to the background similar to the foreground may be reduced.

Figure 7:
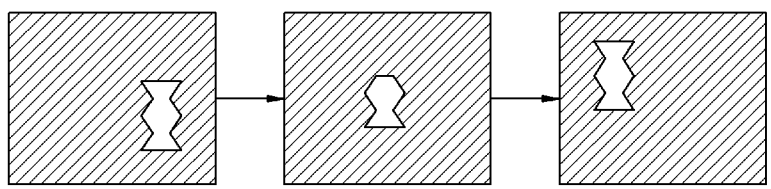
FIG. 7 is a view illustrating a change in the foreground extraction result according to time according to an exemplary embodiment.

FIG. 7 is a view illustrating a change in the foreground extraction result according to time according to an exemplary embodiment. Referring to FIG. 7, the foreground/background detection unit 201 changes a foreground/background determination mode when it is determined that the foreground detected as having a different size is the same object, referring to a foreground tracking result that is feedbacked from the tracking unit 203. Accordingly, since the size of the foreground may be corrected, continuation of a foreground detection error may be prevented.

The foreground/background detection unit 201 determines whether the current pixel is a foreground or a background, considering a surrounding background as in a method explained using Equation 3, with respect to an area other than the estimated detection area.

The tracking unit 203 tracks a foreground of a foreground detection image output from the foreground/background detection unit 201 and feedbacks a tracking result to the foreground/background detection unit 201 (S803).

The tracking unit 203 generates a label for a detected foreground. Accordingly, it can be seen that the foreground detected from a continuously input image is detected with respect to the same object. A label may be assigned according to an identification number system that is internally used and may be indicated directly on an image or not. The tracking unit 203 tracks a foreground by applying a proportional-integral-derivative (PID) control method to the foreground detection result with respect to the previous input image and the foreground detection result with respect to the current input image, and feedbacks a tracking result to the foreground/background detection unit 201.

Assuming that a difference between the foreground detection result with respect to the previous input image and the foreground detection result with respect to the current input image is "e", the tracking result θ in the current input image according to the PID control method may be updated according to Equation 4. Since the PID control method is a well-known technology, a detailed description thereof will be omitted herein. In Equation 4, "$k_i$" denotes an integral gain parameter, "$k_p$" denotes a proportional gain parameter, and "$k_d$" denotes a derivative gain parameter.

$$\dot{\theta} = k_d \ddot{e} + k_p \dot{e} + k_i e \quad (4)$$

The background update unit 300 updates the background model based on time information for each pixel of the current input image (S900). An updated background model becomes a background model of a next input image. The time information for each pixel is an age value assigned to each pixel input according to a change of a monitoring image by the motion of a camera. The background update unit 300 determines a weight value based on the age value and updates the background by setting a study rate differently for each pixel by applying the weight value to each pixel.

Equations 5 to 7 are equations for explaining background model update. The updated background model is an RGB model. Thus, values of Equations 5 to 7 for updating the background model are pixel values of an RGB image.

$$\text{Mean}(x_i^t) = \quad (5)$$
$$(\text{Mean}(x_i^{t-1}) + |\text{Input}(x_i^t) - \text{Mean}(x_i^{t-1})|) \cdot (1 - \alpha) + \text{Input}(x_i^t) \cdot \alpha$$

$$\text{Var}(x_i^t) = \text{Var}(x_i^{t-1}) \cdot (1 - \alpha) + T_3 \cdot (\text{Input}(x_i^t) - \text{Mean}(x_i^{t-1})) \cdot \alpha \quad (6)$$

$$\alpha = \frac{1}{\text{Age}(x_i^{t-1})} \quad (7)$$

Referring to Equation 5, a background mean value Mean($x_i^t$) of an updated pixel, that is, a pixel in the next background model, is determined by the weighted sum of a background mean value Mean($x_i^{t-1}$) of a pixel of the current background model and a pixel value Input($x_i^t$) of a pixel of the current input image. The term of an absolute value "|Input($x_i^t$)−Mean($x_i^{t-1}$)|" of a difference between the pixel value of a pixel of the current input image and the background mean value of a pixel of the current background model included in the weighted sum of Equation 5 is a term to adapt the background model to a sharp change in illumination.

Referring to Equation 6, a background variance value Var($x_i^t$) of a pixel of the next background model is determined by the weighted sum of a background variance value Var($x_i^{t-1}$) of a pixel of the current background model and a pixel value of a pixel of the current input image. When a threshold value T3 multiplied to a difference Input($x_i^t$)−Mean($x_i^{t-1}$) between the pixel value of a pixel of the current input image and the background mean value of a pixel of the current background model included in the weighted sum of Equation 6 is large, a change of a variance value increases, and, although mis-alarm in the object detection is reduced, an object may not be actually detected. Thus, it is preferable, although not necessarily required, to set an appropriate threshold value T3 considering the relationship between a mis-alarm rate and the object detection.

A weight value α applied to Equations 5 and 6 is determined by Equation 7. The weight value α is a reciprocal number of the age value that functions as a study speed (study rate). The age value is the number of pixels corresponding to the current pixel in series of the background model from first background model to a background model at time t (next background model which is generated based on the current input image). That is, whenever a new image is input, the age value of a pixel in an area where the background model and a new input image are overlapped with each other increases by 1. The age value of a pixel of a newly input area starts from 1. Since a pixel of the newly input area becomes a first pixel in a next background model, the age value is 1. Thus, as the weight value applied to a pixel of the newly input area is larger than that of a pixel of the overlapping area, a high study rate is set for a pixel of the newly input area.

Figures 8A, 8B, 8C:
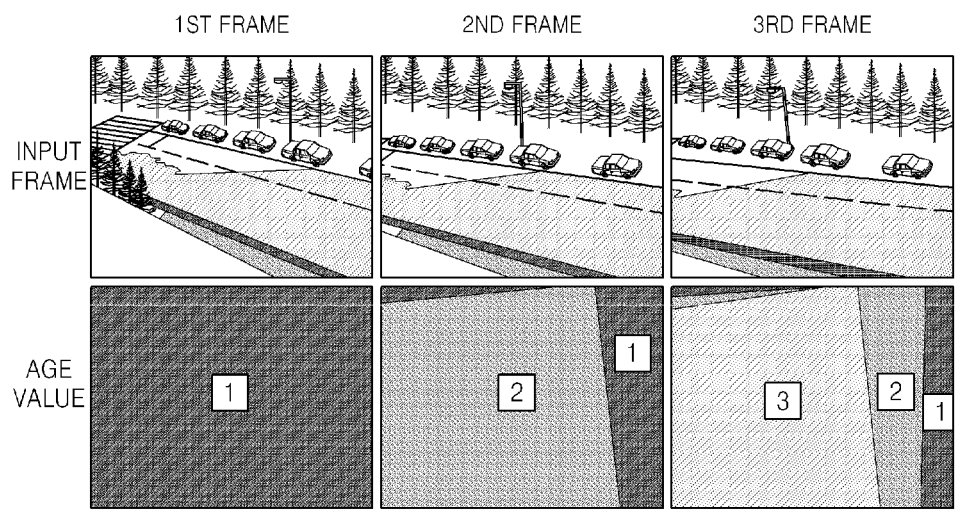
FIGS. 8A-8C illustrate an example of setting an age value according to an exemplary embodiment.

FIGS. 8A-8C illustrate an example of setting the age value according to an embodiment. Referring to FIGS. 8A-8C, since each pixel at the first frame is a pixel of a newly input area, the age value is 1. The age value of a pixel in an area where the first frame and a second frame that is newly input are overlapped with each other is 2. The age value of a pixel of a newly input area by the second frame starts from 1. Next, a third frame is input and the age value of a pixel in an area where the first to third frames are overlapped with one another is 3. The age value of a pixel in an area where the first and second frames are overlapped with each other is 2. The age value of a pixel of a newly input area by the third frame is 1. After a fourth frame, the age value of each pixel is similarly set according to the number of being overlapped from the first frame to the $n^{th}$ frame.

Equations 5 to 7 may be used for calculation of the background mean value and the background variance value of Equation 3. The values of Equations 5 to 7 are pixel values of a filtered or filtered/warped image.

Figure 10:
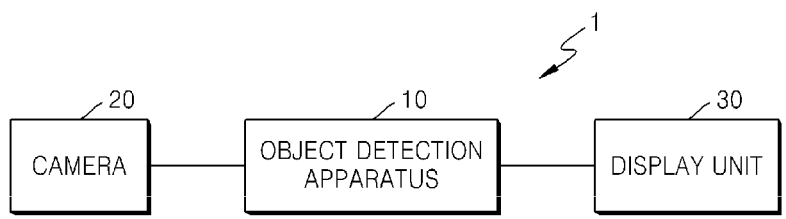
FIG. 10 is a block diagram schematically illustrating a structure of a monitoring system according to an exemplary embodiment.

FIG. 10 is a block diagram schematically illustrating a structure of a monitoring system 1 according to an exemplary embodiment. Referring to FIG. 10, the monitoring system 1 according to the present embodiment includes a camera 20, an object detection apparatus 10, and a display unit 30.

The camera 20 is arranged at a fixed position of a particular place and is a PTZ camera having pan, tilt, and zoom functions. The camera 20 may capture an image by rotating a body at a fixed position by using a PTZ function.

The object detection apparatus 10 may perform a moving object detection function with respect to an image input from the camera 20 through a software and/or hardware structure, as described above with reference to FIGS. 1 to 9.

The object detection apparatus 10 obtains a clear image by, for example, DOG filtering, an input image and a background image (background model) which are adjacent in terms of time, extracts feature points from the input image and the background image by using, for example, LKT tracking, and calculates a homography matrix. The object detection apparatus 10 finds an overlapping area between the input image and the background image by warping the background image by applying the homography matrix to the DOG-filtered background image, thereby detecting a foreground.

The object detection apparatus 10 determines whether the current pixel is a foreground, considering the background around the current pixel. The object detection apparatus 10 uses a time-mean pixel value of a pixel of the background image. Thus, the object detection apparatus 10 may accurately detect a moving object by detecting a foreground using time-space information of the background image.

Also, the object detection apparatus 10 generates a next background image by updating the background image based on time information for each pixel of the input image. When the background image is updated, the object detection apparatus 10 may set a study rate for each pixel of the background image, considering a characteristic that the input image changes according to the motion of the PTZ camera. The object detection apparatus 10 finds an overlapping area, that is, corresponding pixels, between the input image and the background image, and calculates the age value functioning as a study rate. The object detection apparatus 10 updates the background image by applying a weight value set according to the age value to each pixel. Accordingly, by applying a high weight value to a pixel of a newly input area, the study rate of a corresponding pixel may be set to be high.

The object detection apparatus 10 tracks a foreground by generating a label to a detected foreground and uses a tracking result for detecting a foreground of a next input image. When a foreground of the same label is continuously detected for a predetermined time, the object detection apparatus 10 detects a foreground in comparison between the current pixel and a corresponding pixel of the background image, without considering the background around the current pixel of the input image.

Since a structure and method for detecting an object in the object detection apparatus 10 is already described above with reference to FIGS. 1 to 9, detailed descriptions thereof will be omitted herein.

The object detection apparatus 10 may operate as an internal structural element in an image photographing system such as a monitoring camera or as an independent apparatus by being mounted in a computer, a personal digital assistant (PDA), a portable multimedia player (PMP), a mobile phone, etc.

The display unit 30 displays a monitoring image showing a moving object. The display unit 30 may provide a user with visual information and/or audible information and may be formed as a liquid crystal display (LCD) panel, an organic light emitting display (OLED) panel, an electrophoretic display (EPD) panel, etc. The display unit 30 may be formed as a touch screen type to receive a user input by touch.

The object detection apparatus 10 may detect an object with superior performance by reducing misdetection of an object through a time-space based background model and obtaining a real-time detection by using a background model having the same size as an input image under a variety of situations, for example, the size of an object is small or the color of a background and an object are similar to each other, in detecting an object in the PTZ camera.

Further, the object detection apparatus 10 performs an efficient detection using a less storage space because a background having the same size as an input image is generated by using recent images only without storing the entire background model.

In addition, the object detection apparatus 10 may provide a more amount of information than conventional methods when a monitoring system tracks or recognizes an object, because the object detection apparatus 10 detects an object more accurately.

A method of accurately detecting an object in a PTZ camera according to the exemplary embodiments may be applied to a system for searching for moving objects using a camera installed on a mobile robot or a vehicle and taking a reaction.

As described above, according to the exemplary embodiments, a moving object may be effectively and accurately detected in a monitoring system using a PTZ camera. However, the inventive concept is not limited to using only a PTZ camera but may apply to a general-purpose camera.

While the inventive concept has been particularly shown and described with reference to the exemplary embodiments using specific terminologies, the embodiments and terminologies should be considered in descriptive sense only and not for purposes of limitation. Therefore, it will be understood by those of ordinary skill in the art that various changes in form and details may be made therein without departing from the spirit and scope of the inventive concept as defined by the following claims.

The particular implementations shown and described herein are illustrative examples and are not intended to otherwise limit the scope of the inventive concept in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

While the inventive concept has been particularly shown and described with reference to exemplary embodiments thereof, it will be understood by those skilled in the art that various changes in form and details may be made therein without departing from the spirit and scope of the inventive concept as defined by the appended claims.

What is claimed is:

1. An apparatus for detecting an object, comprising a hardware processor to implement:
a foreground/background detector configured to detect a foreground by comparing corresponding pixel between a background model, generated based on a previous input image, and a current input image; and
a background updater configured to update the background model based on time information of each pixel of the current input image; and
a tracker configured to track the detected foreground in next input images,
wherein the foreground/background detector is configured to classify a current pixel of the current input image into a foreground pixel or a background pixel by comparing pixel values of the current pixel and a pixel of the background model corresponding to the current pixel when the current pixel belongs to a detection area estimated according to a result of tracking the detected foreground for a predetermined time,
wherein the foreground/background detector is configured to classify the current pixel of the current input image into the foreground pixel or the background pixel by comparing pixel values of the current pixel and comparison pixels of background model, the comparison pixels corresponding to the current pixel and at least one neighboring pixel of the current pixel in the background model, when the current pixel does not belong to the estimated detection area, and
wherein the background updater is configured to update the background model by using a weight value for each pixel of the current input image, the weight value being a reciprocal number of an age value determined according to a time information of each pixel of the current input image.

2. The apparatus of claim 1, further comprising:
a filter configured to filter the current input image and the background model;
a homography matrix estimator configured to estimate a homography matrix between the current input image and the background model;
an image aligner configured to convert the background model by applying the homography matrix to a filtered background model, and align a converted background model and a filtered current input image; and
a feature points extractor configured to extract feature points of the background model and track corresponding feature points in the current input image,
wherein the homography matrix estimator is configured to estimate the homography matrix based on a relationship between the feature points of the current input image and the background model, and
wherein the feature points extractor is implemented by using the hardware processor.

3. The apparatus of claim 1,
wherein each of the at least one neighboring pixel is a pixel having a Euclidian distance from the current pixel in a space which is within a first threshold value.

4. The apparatus of claim 1, wherein the foreground/background detector is configured to classify the current pixel into the background pixel if a difference between a time-mean value of at least one of the comparison pixels of the background model and a pixel value of the current pixel is smaller than a multiplication of a variance value of the at least one of the comparison pixels and a second threshold value.

5. The apparatus of claim 1, wherein the tracker is configured to generate a label for the detected foreground.

6. The apparatus of claim 5, wherein, if a foreground having the same label is continuously detected in the next input images as a result of the tracking, the foreground/background detector is configured to estimate the detection area.

7. The apparatus of claim 1, wherein the current input image is obtained by moving a camera by at least one of pan, tilt and zoom operations, from a state when the camera obtained the previous input image.

8. A method of detecting an object using a camera, comprising:
detecting, by using a foreground/background detector, a foreground by comparing corresponding pixels between a background model, generated based on a previous input image, and a current input image;
tracking the detected foreground in next input images; and
updating the background model based on time information of each pixel of the current input image,
wherein the detecting the foreground comprises:
classifying a current pixel of the current input image into a foreground pixel or a background pixel by comparing pixel values of the current pixel and a pixel of the background model corresponding to the current pixel when the current pixel belongs to a detection area estimated according to a result of the tracking for a predetermined time; and
classifying the current pixel of the current input image into the foreground pixel or the background pixel by comparing pixel values of the current pixel and comparison pixels of the background model, the comparison pixels corresponding to the current pixel and at least one neighboring pixel of the current pixel in the background model, when the current pixel does not belong to the estimated detection area, and
wherein the updating of the background model comprises:
updating the background model by using a weight value for each pixel of the current input image, the weight value being a reciprocal number of an age value, the age value being determined according to the time information of each pixel of the current input image.

9. The method of claim 8, wherein the estimating the homography matrix comprises:
filtering, by using a filter, the current input image and the background model;
estimating, by using a homography matrix estimator, a homography matrix between the current input image and the background model;
converting, by using an image aligner, the background model by applying the homography matrix to a filtered background model and aligning a converted background model and a filtered current input image;
extracting feature points of the background model and tracking corresponding feature points in the current input image; and
estimating the homography matrix based on a relationship of the feature points between the current input image and the background model.

10. The method of claim 8,
wherein each of the at least one neighboring pixel is a pixel having a Euclidian distance from the current pixel in a space which is within a first threshold value.

11. The method of claim 8, wherein the classifying of the current pixel of the current input image comprises classifying the current pixel into the background pixel if a difference between a time-mean value of at least one of the comparison pixels of the background model and a pixel value of the current pixel is smaller than a multiplication of a variance value of the at least one of the comparison pixels and a second threshold value.

12. The method of claim 8, further comprising generating a label for the detected foreground.

13. The method of claim 12, wherein the detecting the foreground comprises, if a foreground having the same label is continuously detected in the next input images as a result of the tracking, estimating the detection area.

14. The method of claim 8, wherein the current input image is obtained by moving a camera by at least one of pan, tilt and zoom operations, from a state when the camera obtained the previous input image.

15. An apparatus for detecting an object, comprising a hardware processor to implement:
   an image input receiver configured to receive a current input image;
   a foreground/background detector configured to determine a current pixel of the current input image as a foreground or a background by comparing a pixel value of the current pixel with a pixel value of at least one comparison pixel of at least one background model, the at least one comparison pixel corresponding to at least one of the current pixel and a neighboring pixel of the current pixel of the current input image; and
   a tracker configured to track a detected foreground in next input images; and
   a background updater configured to update the background model based on time information of each pixel of the current input image,
   wherein the at least one background model is generated based on at least one previous input image,
   wherein the foreground/background detector is configured to classify the current pixel of the current input image into a foreground pixel or a background pixel by comparing pixel values of the current pixel and a pixel of the background model corresponding to the current pixel, when the current pixel belongs to a detection area estimated according to a result of tracking the detected foreground for a predetermined time, and
   wherein the foreground/background detector is configured to classify the current pixel of the current input image into the foreground pixel or the background pixel by comparing pixel values of the current pixel and comparison pixels of the background model, the comparison pixels corresponding to the current pixel and at least one neighboring pixel of the current pixel in the background model, when the current pixel does not belong to the estimated detection area.

16. The apparatus of claim 15, wherein the current input image is obtained by moving a camera by at least one of pan, tilt and zoom operations, from a state when the camera obtained the at least one previous input image.

* * * * *